L. Rundquist,
Stump Elevator.
No. 41,865.  Patented Mar. 8, 1864.
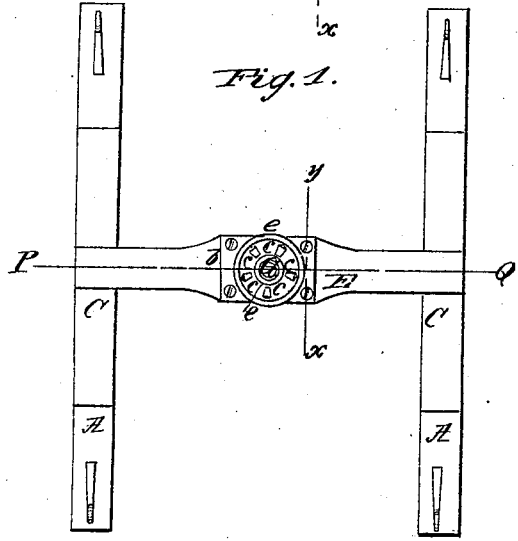
Fig. 1.
Fig. 2.
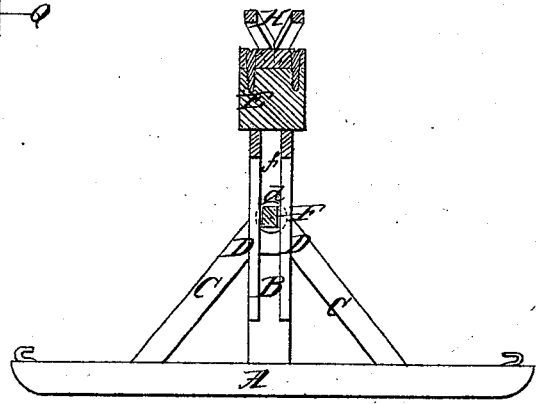
Fig. 3.
Witnesses
Randolph Boyu Jr.
L. G. Hine
Inventor
C. Rundquist
by his attorney
G. B. Fowles

UNITED STATES PATENT OFFICE.

CHARLES RUNDQUIST, OF KNOXVILLE, ILLINOIS.

IMPROVEMENT IN STUMP-EXTRACTORS.

Specification forming part of Letters Patent No. 41,865, dated March 8, 1864.

*To all whom it may concern:*

Be it known that I, CHARLES RUNDQUIST, of Knoxville, in the county of Knox, in the State of Illinois, have invented a new and useful Improvement in Stump-Extractors; and I do hereby declare that the following is a full, clear, and exact description of the construction and operation of the same, reference being had to the annexed drawings, making a part of this specification, of which—

Figure 1 is a top view of my improved stump-extractor, showing the nut $a$, to which is attached the lever or sweep H, removed from the vertical screw G in order to afford a view of the radial conical rollers $c\ c\ c\ c\ c$; Fig. 2, a vertical section, as indicated by the line $p\ q$ in Fig. 1; Fig. 3, a vertical section, as indicated by the line $x\ y$ in Figs. 2 and 1.

The nature of my improvement is to secure the greatest durability and strength in the construction of a stump-extractor, in which the operation of pulling the stump or other protuberance from the ground may be more easily facilitated than heretofore.

First. To accomplish this I use radial conical rollers to relieve the friction as much as possible, peculiar to the screw and lever plan of pulling stumps. I am aware of friction-balls having been used for the same purpose; but it will be apparent that radial rollers on fixed axles between collars are of a more decided advantage than balls, for the reason that the balls, having no common or fixed place in grooves into which they are placed, frequently come together, and in the course of time in the usage of the machine lose their spherical form, and thereby increase rather than diminish friction, and when thus jammed together on one side in the grooves the pressure of the nut, instead of being uniform, is uneven, and the consequence is the screw-threads are rapidly worn off, besides requiring a greater amount of labor in carrying the sweep around than would otherwise be in the use of the radial rollers.

Second. I secure a guide to the vertical screw (to be hereinafter referred to) for the purpose of keeping it perfectly steady and to relieve the straining to which it is subjected in pulling the stump. I am thus enabled by the use of the guide to pull off from the stump—that is, in a horizontal or oblique direction—when necessary in a much better respect than heretofore.

To enable others skilled in the art to make and use my invention, I will now proceed to describe its construction and operation.

I have two base-pieces, A A, of stout timber. On the top of each and perpendicular to the center are two uprights, B B, well stayed to the base-pieces by braces C C C C. The two are then connected together by the transverse piece E, and well stayed underneath to the uprights by the braces D D D D.

On the inside of the uprights are grooves $f\!f$, as seen more clearly in Fig. 2, made to receive the ends of the guide-piece F, which extends across and embraces the vertical screw G in a secure manner, having metallic anti-friction rollers $d\ d$ on them of sufficient looseness to admit of a free perpendicular movement (with the screw) in the grooves.

Let in on the top of the transverse piece E is a bearing-plate, $b$, whose top surface is made to receive the radial conical rollers $c\ c\ c\ c\ c$, as seen in Fig. 1, which are placed on fixed axles between collars $e\ e$, surrounding the vertical screw. The underneath surface of the nut $a$ is of a form corresponding to that of the bearing-plate, and when it is turned by means of the sweep or lever H, to which it is secured, the vertical screw will begin to rise upward, carrying with it the guide-piece, while the radial rollers pass around between the upper and lower surfaces of the nut and bearing-plate with comparative ease until the stump is extracted.

My machine may be carried about on wheels, or dragged without them, whichever the most convenient.

Having thus fully described my improved stump-extractor, what I claim as new, and desire to secure by Letters Patent, is—

The guide F, vertical screw G, grooves $f\!f$ in uprights B B, and radial conical rollers $c\ c\ c\ c\ c$, as herein arranged and combined, operating substantially in the manner and for the purpose specified.

CHARLES RUNDQUIST.

Witnesses:
SWAN PETERSON,
BENJAMIN KERSEY.